Oct. 13, 1959 B. R. STACHIEWICZ 2,908,760
FREQUENCY BAND INVERTING REPEATER FOR USE
IN CARRIER COMMUNICATION SYSTEMS
Filed Oct. 29, 1956
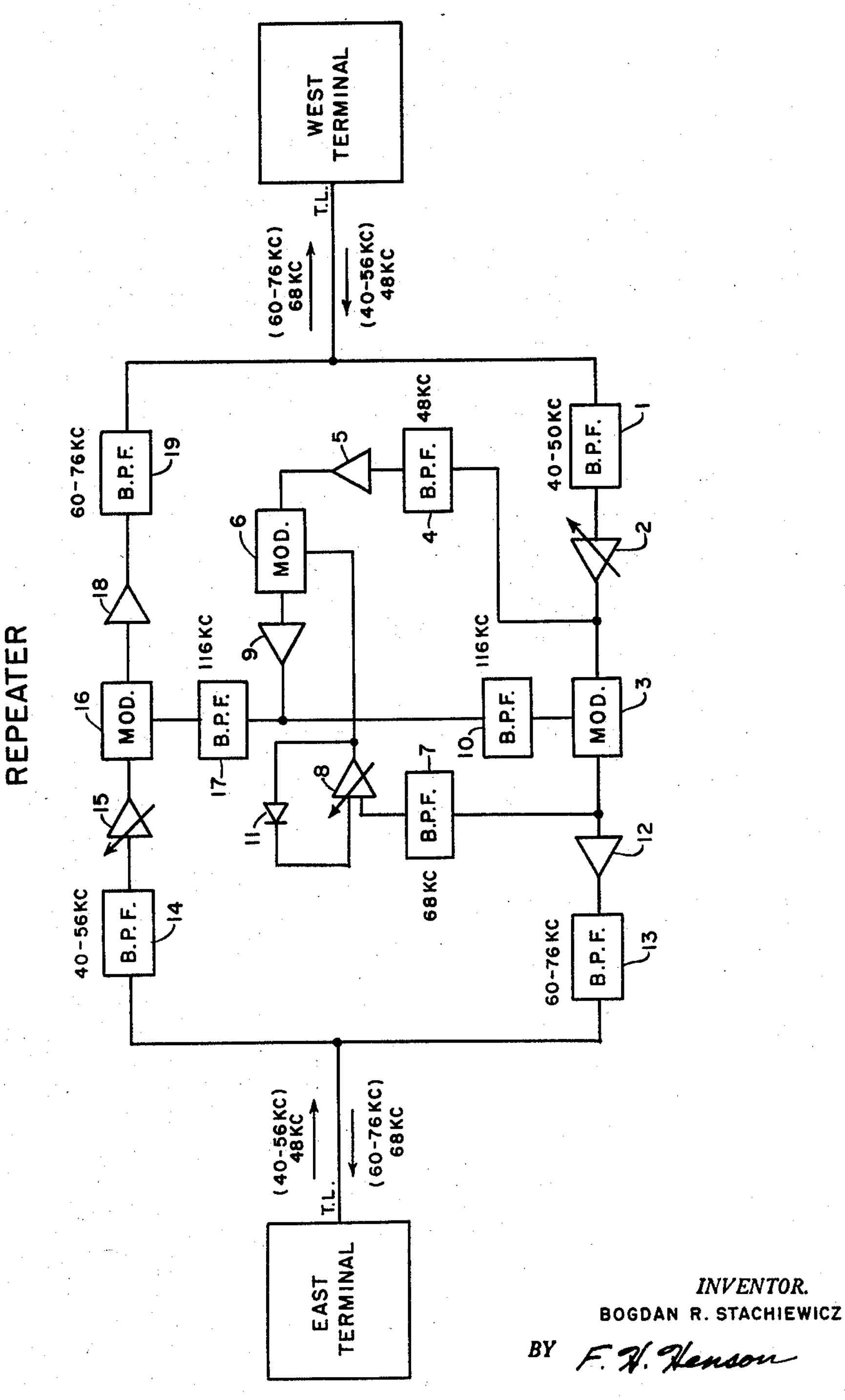
INVENTOR.
BOGDAN R. STACHIEWICZ
BY F. H. Henson
AGENT United States Patent Office 2,908,760
Patented Oct. 13, 1959

2,908,760

FREQUENCY BAND INVERTING REPEATER FOR USE IN CARRIER COMMUNICATION SYSTEMS

Bogdan R. Stachiewicz, Rochester, N.Y., assignor to General Dynamics Corporation, Rochester, N.Y., a corporation of Delaware Application October 29, 1956, Serial No. 619,061

5 Claims. (Cl. 179—15.5)

This invention relates in general to carrier communication systems and, more particularly, to frequency band inverting repeaters for use in carrier communication systems.

Band inverting or frequency frogging repeaters, which are used to achieve slope correction and crosstalk reduction, have found extensive use in recent years in carrier communication systems. At each repeater, frequency frogging, or the successive interchange of the high and low frequency bands used for two-way transmission, is achieved by frequency band shifting modulators. At the same time, the order of channels within each band is inverted so that the line slope introduced in one section of the transmission line is canceled in the succeeding section of the transmission line.

Prior to this invention, it has been the practice to utilize a crystal control oscillator for the purpose of generating the carrier wave for the frequency band shifting modulators in each repeater. If the oscillator in any one of the repeaters should drift in frequency, the frequency error is introduced in the transmitted signals and a distorted reproduction of the transmitted signals is produced at the receiving terminal unless frequency correction of some type is used at the receiving terminal.

Accordingly, it is the general object of this invention to provide a new and improved band inverting repeater for use in carrier communication systems.

It is a more particular object of this invention to provide a new and improved band inverting repeater which includes new and improved apparatus for generating the carrier wave for the frequency band shifting modulators in said repeater.

In accordance with the present invention, the carrier wave for the frequency band shifting modulators in each repeater is derived from a pilot signal transmitted from one of the carrier terminals. In each repeater the received frequency band, including the pilot signal, is applied to the input of the frequency band shifting modulator for that direction of transmission. A band-pass filter, which is sharply tuned to the sum of the center frequencies of the high and low frequency bands minus the frequency of the pilot signal received at that repeater, is connected to the output of said modulator. The received pilot signal is modulated in a second modulator with the signal passed by said filter to produce a carrier wave having a frequency equal to the sum of the center frequencies of the high and low frequency bands. The derived carrier wave is then utilized as a carrier wave for the frequency band shifting modulators.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows a block diagram of first and second carrier terminals interconnected by a two-wire line and a single band inverting repeater.

Referring to the drawing, it will be noted that specific frequency values and frequency ranges have been assigned to the various components of the system. It is to be understood that the operation of the system is in no way limited to the range of frequencies shown and that particular frequency values are shown only for the purpose of illustrating the operation of the system. Also, the invention has been illustrated as embodied in a two-wire system. It will be obvious to those skilled in the art that the illustrated repeater may be used in four-wire and other systems.

As illustrated, the west terminal transmits a 40–56 kc. frequency band and a 48 kc. pilot signal and receives a 60–76 kc. frequency band. Although the pilot signal has been shown as having a frequency equal to the center frequency of the band, the frequency of the pivot signal is not critical and may be any frequency within the band. In practice, the pilot signal selected usually has a frequency near the upper or lower edge of the transmitted frequency band. Since a single band inverting repeater has been illustrated, the east terminal also transmits the low frequency band and receives the high frequency band. If an even number of repeaters are used between the carrier terminals, the transmitting and receiving frequency bands at one of the terminals must, of course, be interchanged.

The 40–56 kc. band transmitted from the west terminal over transmission line TL is passed by band-pass filter 1 in the repeater, amplified by variable gain amplifier 2, and applied to the input of balanced frequency band shifting modulator 3. Also, the 48 kc. pilot signal is picked off by band-pass filter 4, amplified by amplifier 5, and applied to the input of modulator 6. Also, a 68 kc. signal, which is the sum of the center frequencies of the high and low bands minus the frequency of the received pilot signal, appearing at the output of modulator 3, is picked off by band-pass filter 7, amplified by amplifier 8 and applied to modulator 6.

Band-pass filter 7 must be sharply tuned to 68 kc. and is preferably of the crystal filter type. When power is first applied to the circuit, the operation of this portion of the system is initiated by a transient. The 48 kc. pilot signal applied to the input of modulator 6 is modulated with the 68 kc. signal passed by filter 7, and amplified by amplifier 8, to produce a 116 kc. signal at the output of modulator 6. This signal is amplified by amplifier 9, passed by band-pass filter 10, and applied as a carrier wave to frequency band shifting modulator 3. The 116 kc. carrier wave is, of course, modulated with the 48 kc. pilot signal in modulator 3 to produce a 68 kc. signal which is, in turn, passed by filter 7. Thus, it can be seen that the operation is of the closed ring type and, once started, is self-sustaining.

To further explain the operation of this portion of the circuit, it will be noted that the output signal from variable gain amplifier 8 is rectified by rectifier 11 and applied to the input of amplifier 8 for the purpose of adjusting the gain of said amplifier. When power is first applied to the circuit, the gain of amplifier 8 is at a maximum. Since the over-all gain at this time through the closed ring just described is much greater than when the operation is stabilized, the circuit tends toward oscillation at 68 kc. As the level of 68 kc. signal increases, the gain of amplifier 8 is, of course reduced.

The lower sideband of the 116 kc. carrier wave modulated with the 40–56 kc. band in modulator 3, and amplified in amplifier 12, is selected by band-pass filter 13 and transmitted over the next section of the transmission line TL to the next repeater or to the east terminal if only one repeater is provided. The next repeater (not shown) along the transmission line picks off the pilot signal of 68 kc. with a filter corresponding to the filter 4 and a 48 kc. signal with a filter corresponding to filter 7. In other words, band-pass filters 4 and 7 must be interchanged in the even numbered repeaters. Since the pilot signal transmitted from the west terminal is utilized to derive the carrier wave for the band shifting modulators in each repeater, filters 4 and 7 are preferably coupled to the input and output, respectively, of modulator 3 by high impedance coupling. This may be accomplished by transformer coupling or in any other well known manner.

For transmission in the opposite direction, the 40–56 kc. band transmitted by the east terminal is passed by filter 14, amplifier by variable gain amplifier 15, and applied to the input of balanced frequency band shifting modulator 16. The 116 kc. carrier wave passed by band-pass filter 17 is modulated in modulator 16 with the 40–56 kc. signals. The resulting signal is amplified in amplifier 18 and the lower sideband of 60–76 kc. is passed by band-pass filter 19 to the transmission line TL. The pilot signal transmitted from the east terminal may be used to control the gain of the repeater amplifiers, such as amplifier 15, and to control the gain of amplifiers in the receiving equipment at the west terminal. Likewise, the pilot signal transmitted from the west terminal may also be used to control the gain of repeater amplifiers, such as amplifier 2, and to control the gain of amplifiers in the receiving equipment at the east terminal.

An important feature of the invention is that each repeater automatically corrects for any frequency errors introduced in the transmitted signals by the preceding repeater or section of the transmission line. To illustrate this feature of the invention, assume that the 40–56 kc. band transmitted from the west terminal arrives at the illustrated repeater with a frequency error of E1. Since the pilot frequency is subject to the same frequency error as the transmitted sideband, it is received at the repeater at a frequency of 48 kc.+E1. The pilot signal of 48 kc.+E1 is modulated with the 68 kc. signal passed by filter 7 to produce a carrier wave of frequency 116 kc.+E1 and since the lower sideband of the carrier wave modulated with the received sideband in modulator 3 is transmitted toward the east terminal, the transmitted band has a frequency of (116 kc.+E1)−(48–56 kc.+E1) or 60–76 kc. Also, the signals transmitted from east to west are pre-shifted in frequency in the repeater by an amount E1 since the carrier wave for frequency band shifting modulator 16 has a frequency of 116 kc.+E1. Thus, the error E1 is canceled out in the next section of transmission line TL, or the next repeater toward the west terminal, or by the element which introduced the error E1 into the signals transmitted from west to east.

While there has been shown and described what is at present considered to be the preferred embodiment of the invention, modifications thereto will readily occur to those skilled in the art. It is not, therefore, desired that the invention be limited to the particular embodiment shown and described, and it is intended to cover in the appended claims all such modifications as fall within the true spirit and scope of the invention.

What is claimed is:

1. In a two-way carrier communication system in which opposite directions of transmission between first and second carrier terminals are characterized by high and low frequency bands respectively, a transmission network interconnecting said first and second terminals and including a repeater, means at said first terminal for transmitting a pilot frequency which lies within the frequency band transmitted by that terminal, means in said repeater for deriving from said pilot frequency a carrier wave having a frequency equal to the sum of the center frequencies of said high and low frequency bands, means in said repeater for modulating said carrier wave with the frequency band received from said first terminal and for transmitting the resulting lower sideband of said modulated carrier wave toward said second terminal, and means in said repeater for modulating said carrier wave with the frequency band received from said second terminal and for transmitting the resulting lower sideband of said modulated carrier wave toward said first terminal, whereby the high and low frequency bands are interchanged in their passage through said repeater.

2. In a two-way carrier communication system comprising first and second carrier terminals interconnected by a band inverting repeater, each of said terminals being arranged to transmit one frequency band and receive the other frequency band of first and second frequency bands, the particular bands transmitted and received by each of said terminals being so selected that the input frequency allocations to said repeater are alike in the two opposite directions of transmission and the output frequency allocations from said repeater are alike in the two opposite directions of transmission, means at one of said terminals for transmitting a pilot signal within the frequency band transmitted by that terminal, means in said repeater for deriving from said pilot signal a carrier wave having a frequency equal to the sum of the center frequencies of said first and second bands, means in said repeater for modulating said carrier wave with the frequency band received from said first terminal and for transmitting the resulting lower sideband of said modulated carrier wave toward said second terminal, and means in said repeater for modulating said carrier wave with the frequency band received from said second terminal and for transmitting the resulting lower sideband of said modulated carrier wave toward said first terminal.

3. In a two-way carrier communication system in which opposite directions of transmission between first and second carrier terminals are characterized by high and low frequency bands respectively, a transmission network interconnecting said first and second terminals and including a repeater, means at said first terminal for transmitting a pilot frequency which lies within the frequency band transmitted by said first terminal, said repeater including first and second modulators, means for applying the frequency band received from said first terminal to the input of said first modulator, means for applying the frequency band received from said second terminal to the input of said second modulator, a band-pass filter, means for connecting said filter to the output of said first modulator, said filter being sharply tuned to a frequency equal to the sum of the center frequencies of said high and low frequency bands minus the frequency of said pilot frequency, means for modulating said pilot frequency with the signal passed by said filter to produce a carrier wave having a frequency equal to the sum of the center frequencies of said high and low frequency bands, means for applying said carrier wave to said first and second modulators to modulate the frequency band received from said first terminal and the frequency band received from said second terminal respectively, means in said repeater for transmitting the lower sideband of said modulated carrier wave appearing at the output of said first modulator toward said second terminal, and means in said repeater for transmitting the lower sideband of said modulated carrier wave appearing at the output of said second modulator toward said first terminal.

4. In a two-way carrier communication system comprising first and second carrier terminals interconnected by a band inverting repeater, each of said terminals being arranged to transmit one frequency band and receive the other frequency band of first and second frequency bands, the particular bands transmitted and received by each of said terminals being so selected that the input frequency allocations to said repeater are alike in the two opposite directions of transmission and the output frequency allocations from said repeater are alike in the two opposite directions of transmission, means at said first terminal for transmitting a pilot signal within the frequency band transmitted by that terminal, said repeater including first and second modulators, means for applying the frequency band received from said first terminal to the input of said first modulator, means for applying the frequency band received from said first terminal to the input of said first modulator, means for applying the frequency band received from said second terminal to the input of said second modulator, a band-pass filter, means for connecting said filter to the output of said first modulator, said filter being sharply tuned to a frequency equal to the sum of the center frequencies of said first and second frequency bands minus the frequency of said pilot signal, means for modulating said pilot frequency with the signal passed by said filter to produce a carrier wave having a frequency equal to the sum of the center frequencies of said first and second frequency bands, means for applying said carrier wave to said first and second modulators to modulate the frequency band received from said first terminal and the frequency band received from said second terminal respectively, means in said repeater for transmitting the lower sideband of said modulated carrier wave appearing at the output of said first modulator toward said second terminal, and means in said repeater for transmitting the lower sideband of said modulated carrier wave appearing at the output of said second modulator toward said first terminal.

5. In a carrier communication system comprising a transmitting terminal and a receiving terminal interconnected by a plurality of band inverting repeaters, means at said transmitting terminal for transmitting a first frequency band and a pilot signal within said band, each of said repeaters including a modulator and a band-pass filter, means for applying the received frequency band at each repeater to the input of the modulator, means for connecting said filter to the output of said modulator, the filter in each repeater being tuned to the sum of the center frequencies of said first frequency band and of a second non-overlapping frequency band minus the frequency of the pilot signal received at that repeater, means in each repeater for modulating the received pilot signal with the signal passed by said filter to produce a carrier wave, means for applying said carrier wave to said modulator to modulate the received frequency band, and means in each repeater for transmitting the lower sideband of said modulated carrier wave appearing at the output of said modulator to the next succeeding repeater or to said receiver.

References Cited in the file of this patent

UNITED STATES PATENTS

| | | |
|---|---|---|
| 2,530,748 | Winchel | Nov. 21, 1950 |
| 2,611,859 | Bailey et al. | Sept. 23, 1952 |
| 2,634,334 | Kalb | Apr. 7, 1953 |
| 2,695,332 | Caruthers | Nov. 23, 1954 |